W. M. SMITH.
NUT LOCK.
APPLICATION FILED MAY 29, 1914.
1,112,410.
Patented Sept. 29, 1914.
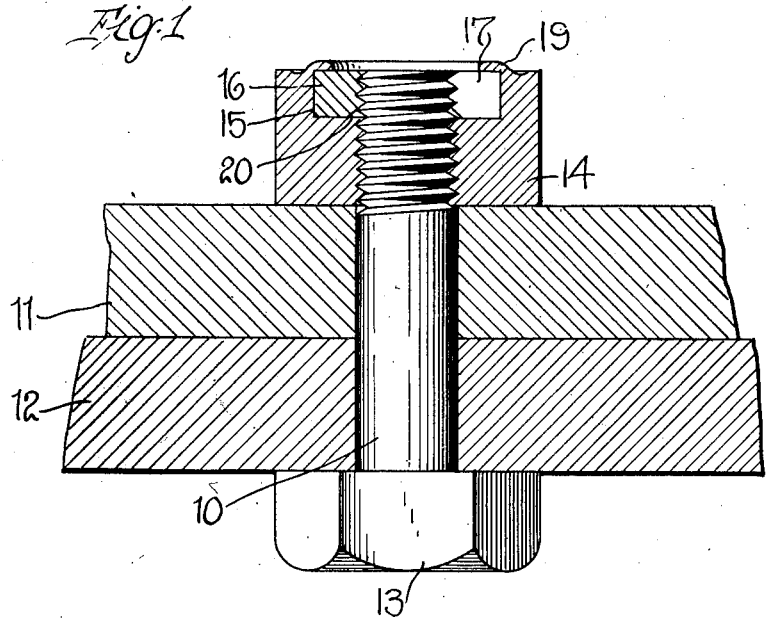
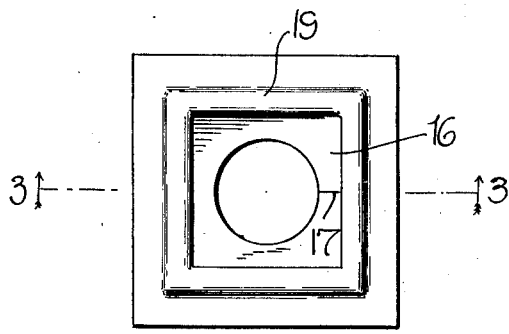
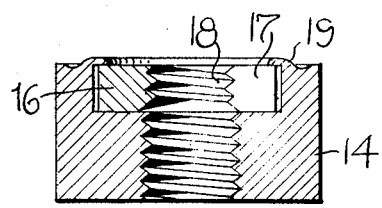
Witnesses
Robert M. Sutphen
M. E. Lowry
Inventor
Wm M Smith
By N. M. Wilson
Attorney

UNITED STATES PATENT OFFICE.

WILLIAM M. SMITH, OF PITTSBURGH, PENNSYLVANIA, ASSIGNOR OF ONE-THIRD TO WILLIAM A. FOUKS, OF TURTLE CREEK, PENNSYLVANIA.

NUT-LOCK.

1,112,410.  Specification of Letters Patent.  Patented Sept. 29, 1914.

Application filed May 29, 1914. Serial No. 841,811.

*To all whom it may concern:*

Be it known that I, WILLIAM M. SMITH, a citizen of the United States, and residing at Pittsburgh, in the county of Allegheny and State of Pennsylvania, have invented certain new and useful Improvements in Nut-Locks, of which the following is a specification.

This invention relates to nut locks, of the type employing a locking washer disposed within a seat formed in the nut.

Nut-locks of the general type above indicated, are open to the objection that they require special tools for their application to, and removal from a bolt, and for the further reason that they lack practicability in the important items of simplicity and cost of manufacture.

The main object of the present invention is to provide a simple and effective nut-lock which may be inexpensively made, and capable of a ready application to and detachment from a bolt, without requiring any special tool, or any manipulation other than that required for the ordinary nut.

A further object of the invention is to provide a nut with a locking device which is automatically secured in clamping engagement with the threads of a bolt by the simple turning of the nut upon the bolt, and removed by reverse turning, in all respects identical with the manner of securing and removing the common form of nut.

A further object of the invention is to provide a nut with a locking device which is a permanent attachment to the nut and operating, practically as a part of the nut structure, as distinguished from the prior art in which removable, independent separate locking means are applied after the nut is screwed upon a bolt.

The invention comprises a nut formed on its outer face with a recess or counter-bore serving as a seat to receive a locking nut, and a supplemental smaller nut fitting within said seat and so constructed and so connected to the other nut that it is adapted to be turned upon a bolt with the turning of the recessed nut of which it is a permanent part, and capable of being expanded automatically by turning contact with the bolt-threads to tightly clamp it between said threads and the walls of said seat.

The embodiment of the invention illustrated by the accompanying drawings has been found a simple and highly efficient construction for accomplishing the results above outlined, and this construction will be now specifically described in connection with the drawing and its distinguishing features of novelty set forth and defined in the appended claims.

In the drawing: Figure 1 is a view partly in section and partly in elevation showing my improved nut-lock in position upon a bolt. Fig. 2 is a top plan of the nut shown in Fig. 1, and, Fig. 3 is a section on the line 3—3 of Fig. 2.

The reference numeral 10 designates a bolt connecting two abutting elements 11 and 12, between the head 13 of the bolt, and a nut 14, the threads of which engage the threads of the bolt. The outer face of the nut 14 is formed with a recess 15, preferably of the square form shown, to receive a supplemental nut 16 severed or split at one of its sides as shown at 17 and formed from resilient metal, preferably spring steel, and having a threaded bore 18 registering with the bore of the nut 14, but of less diameter than the latter. The supplemental nut 16 is seated in the recess 15, after which the outer edges 19 of the walls of the recess 15 are upset to project them inward to overhang the outer edge of the nut 16 on all sides, thus securing said nut 16 within the recess of the nut 14, and permanently securing it to the nut 14. The inner face of the nut 16 is formed with an annular bevel 20 adjacent the innermost thread of said nut. As shown in Fig. 2, the ends of the split nut are in close contact and the nut is therefore normally contracted.

It is obvious from the drawing and the foregoing description that the nuts 14 and 16 are not only permanently connected together, but are so related as to constitute a unitary structure, adapted to be manipulated in the same way as the ordinary integral single nut. When the device is screwed onto the threaded end of a bolt, the annular beveled surface 20 contacts with the outer thread of the bolt, permitting it to enter the nut 16 to engage the threads thereof, and the turning of the nut 14 causes the split nut 16 to expand to grip the walls of the recess. It will be noted that when the two members 14 and 16 are assembled and permanently secured together by the overhanging upset edge of the nut 14, they constitute a single two-part nut, closely resembling the ordinary nut, and as easily marketed and manipulated as the latter.

What I claim as new is:—

1. A lock nut comprising a nut formed on its outer face with a recess, a normally-contracted supplemental resilient split nut fitting said recess, the outer edges of the walls of said recess being upset to project them inward over the outer edges of said resilient nut, to permanently connect the supplemental nut to the recessed nut.

2. A two-part self-locking nut comprising a nut formed on its outer face with a recessed seat, and a split resilient supplemental nut fitting within said recess, and permanently-secured to the first-named nut, said supplemental nut being normally contracted, and adapted to be expanded automatically by being turned upon a bolt, said supplemental nut having an annular beveled surface on its inner face adjacent to its innermost thread.

In testimony whereof I affix my signature in presence of two witnesses.

WILLIAM M. SMITH.

Witnesses:
WM. MACMURDO,
J. D. LEDGER.